United States Patent
Dhua et al.

(10) Patent No.: US 9,449,216 B1
(45) Date of Patent: Sep. 20, 2016

(54) DETECTION OF CAST MEMBERS IN VIDEO CONTENT

(71) Applicant: A9.com, Inc., Palo Alto, CA (US)

(72) Inventors: Arnab Sanat Kumar Dhua, Mountain View, CA (US); Gautam Bhargava, Palo Alto, CA (US); Douglas Ryan Gray, Mountain View, CA (US); Sunil Ramesh, San Jose, CA (US); Colin Jon Taylor, Orinda, CA (US)

(73) Assignee: Amazon Technologies, Inc., Seattle, WA (US)

( * ) Notice: Subject to any disclaimer, the term of this patent is extended or adjusted under 35 U.S.C. 154(b) by 237 days.

(21) Appl. No.: 13/860,347

(22) Filed: Apr. 10, 2013

(51) Int. Cl.
*G06K 9/00* (2006.01)
*G06F 17/30* (2006.01)

(52) U.S. Cl.
CPC ..... *G06K 9/00288* (2013.01); *G06F 17/30793* (2013.01); *G06K 9/00221* (2013.01); *G06K 9/00261* (2013.01)

(58) Field of Classification Search
USPC ....... 382/100, 103, 115, 118, 159, 181, 224, 382/225, 282, 309, 311
See application file for complete search history.

(56) References Cited

U.S. PATENT DOCUMENTS

| | | | | |
|---|---|---|---|---|
| 8,392,183 | B2* | 3/2013 | Weber ................. | G11B 27/034 700/94 |
| 8,689,255 | B1* | 4/2014 | Gregov ............. | H04N 21/4722 725/14 |
| 8,705,810 | B2* | 4/2014 | Wang et al. .................. | 382/118 |
| 2009/0052783 | A1* | 2/2009 | Aoki et al. ..................... | 382/209 |
| 2010/0149305 | A1* | 6/2010 | Catchpole et al. ........... | 382/118 |
| 2011/0007975 | A1* | 1/2011 | Kazama et al. ............... | 382/225 |
| 2012/0039515 | A1* | 2/2012 | Jeong et al. ................... | 382/118 |
| 2012/0213490 | A1* | 8/2012 | Steiner .......................... | 386/241 |
| 2012/0263433 | A1* | 10/2012 | Mei et al. ..................... | 386/241 |
| 2012/0308202 | A1* | 12/2012 | Murata ................ | G11B 27/005 386/241 |
| 2013/0051756 | A1* | 2/2013 | Chao et al. ................... | 382/190 |
| 2013/0322765 | A1* | 12/2013 | Neumann .......... | G06K 9/00765 382/197 |

OTHER PUBLICATIONS

Zhu Liu and Yao Wang, "Major Cast Detection in Video Using Both Speaker and Face Information", IEEE, Transactions on Multimedia, vol. 9 No. 1, Jan. 2007, pp. 89-101.*
Mengdi Xu, Xiaotong Yuan, Jialie Shen and Shuicheng Yan, "Cast2Face: Character Identification in Movie with Actro-Character Correspondence", ACM, Proceedings of the International Conference on Multimedia, Oct. 2010, pp. 831-834.*
U.S. Appl. No. 13/227,097 entitled "Synchronizing Video Content With Extrinsic Data" and filed Sep. 7, 2011.
U.S. Appl. No. 13/601,267 entitled "Enhancing Video Content With Extrinsic Data" and filed Aug. 31, 2012.
U.S. Appl. No. 13/601,235 entitled "Timeline Interface for Video Content" and filed Aug. 31, 2012.
U.S. Appl. No. 13/601,210 entitled "Providing Extrinsic Data for Video Content" and filed Aug. 31, 2012.

* cited by examiner

*Primary Examiner* — Eric Rush
(74) *Attorney, Agent, or Firm* — Thomas | Horstemeyer, LLP

(57) ABSTRACT

Disclosed are various embodiments for detection of cast members in video content such as movies, television shows, and other programs. Data indicating cast members who appear in a video program is obtained. Each cast member is associated with a reference image depicting a face of the cast member. A frame is obtained from the video program, and a face is detected in the frame. The detected face in the frame is recognized as being a particular cast member based at least in part on the reference image depicting the cast member. An association between the cast member and the frame is generated in response to the detected face in the frame being recognized as the cast member.

24 Claims, 8 Drawing Sheets

DETECTION OF CAST MEMBERS IN VIDEO CONTENT

BACKGROUND

People often want more information about the movies and other video content they are watching. To this end, people may search the Internet to find out more information about the video content. This information may include, for example, biographies of actors, production information, trivia, goofs, and so on.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to detection of cast members in video content. Systems may wish to present an identification of the cast member(s) who are present in a current scene of a movie, television show, and so on. Manually creating associations between scenes and cast members may be labor intensive, and exceptionally so when performed on a large scale for a multitude of video programs. Various embodiments of the present disclosure facilitate automated cast member detection in video content using face detection and recognition. Existing data associating cast members with video content may be employed, and facial data models may be updated as part of the face recognition process. Manual disambiguation and confirmation may be used to a limited extent to verify and improve facial data models.

Figure 1:
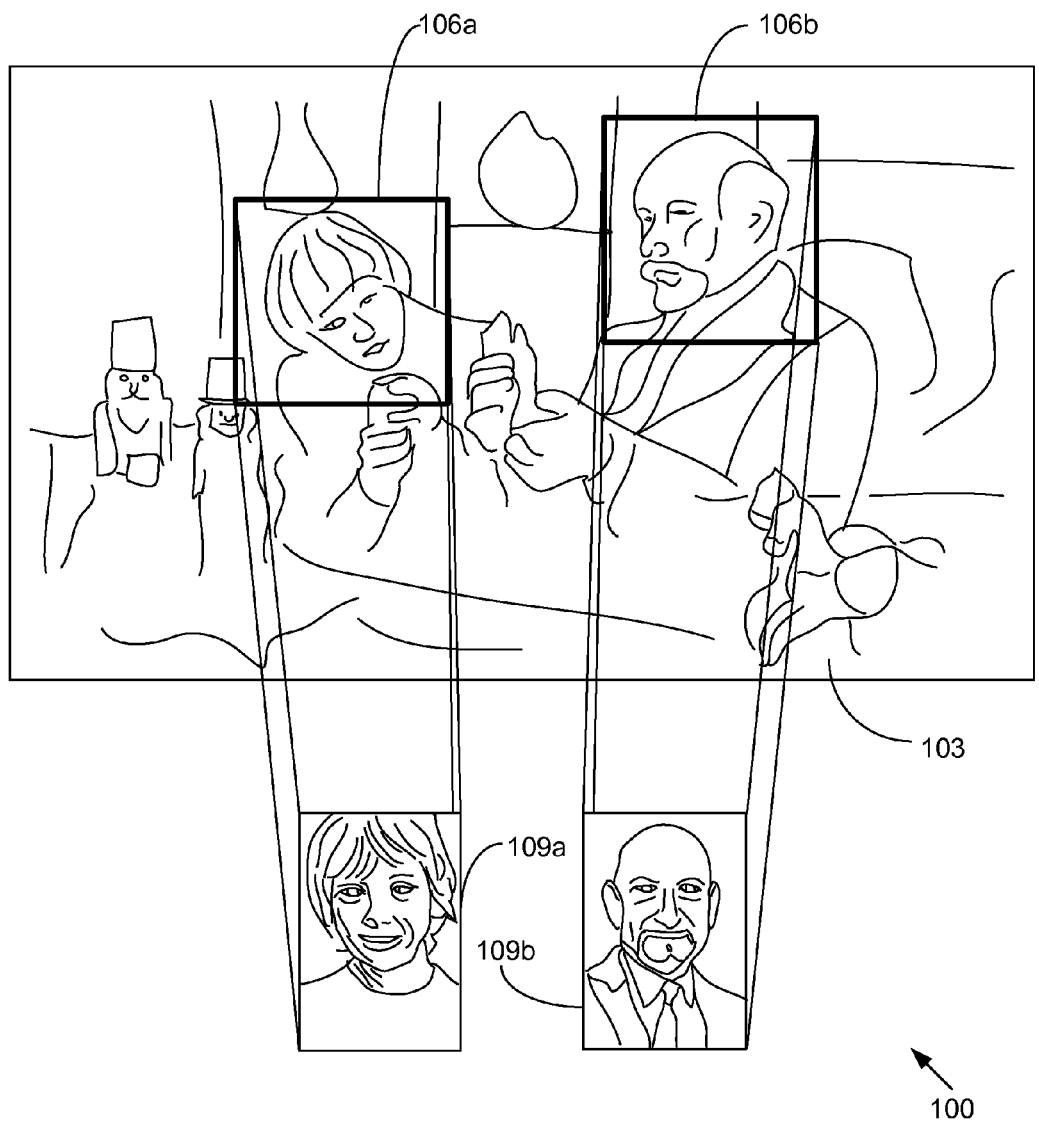
FIG. 1 is a drawing of an exemplary face detection and recognition scenario according to various embodiments of the present disclosure.

Turning now to FIG. 1, shown is an exemplary face detection and recognition scenario 100 according to various embodiments. Face detection is performed on a video frame 103 from a video program. In this example, two faces 106a and 106b are detected. Face recognition is then performed on each of the faces 106a and 106b using reference images 109a and 109b that correspond to cast members that are known to appear in the video program. As a result of the face recognition, the detected face 106a is recognized as being the cast member corresponding to the reference image 109a, and the detected face 106b is recognized as being the cast member corresponding to the reference image 109b. Accordingly, the corresponding cast members may be associated with the video frame 103 and other video frames 103 from the same scene. In the following discussion, a general description of the system and its components is provided, followed by a discussion of the operation of the same.

Figure 2:
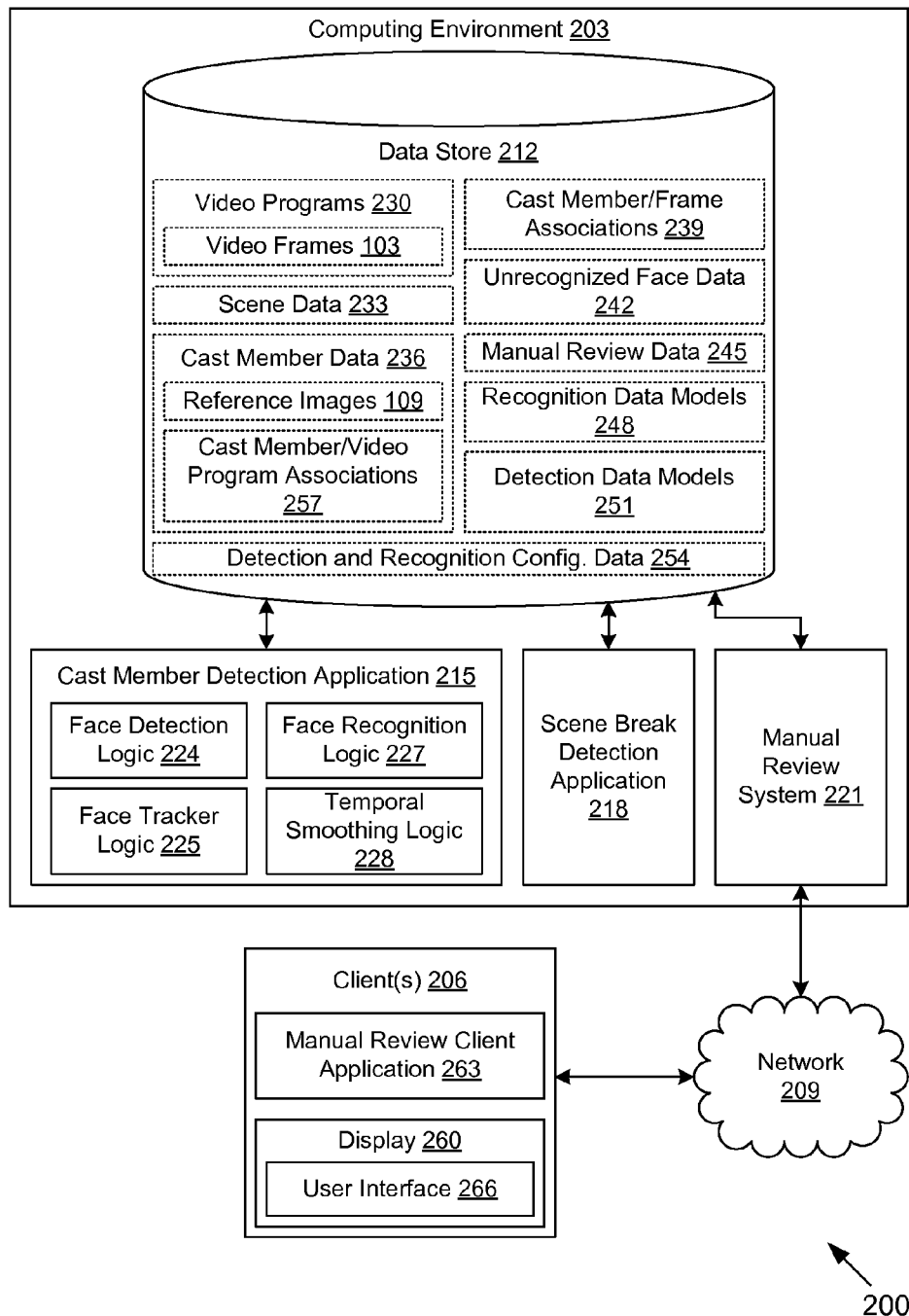
FIG. 2 is a drawing of a networked environment according to various embodiments of the present disclosure.

With reference to FIG. 2, shown is a networked environment 200 according to various embodiments. The networked environment 200 includes a computing environment 203 and one or more clients 206 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that are arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a cast member detection application 215, a scene break detection application 218, a manual review system 221, and other applications, services, processes, systems, engines, or functionality not discussed in detail herein. The cast member detection application 215 is executed to process video frames 103 to determine which cast members appear in which video frames 103. To this end, the cast member detection application 215 may include face detection logic 224, face tracker logic 225, face recognition logic 227, and temporal smoothing logic 228.

The face detection logic 224 is executed to detect whether a face is present in a given video frame 103. The face tracker logic 225 may assist the face detection logic 224 by tracking a sequence of faces occurring across multiple video frames 103, where the faces in the sequence are similar in appearance and geometric proximity or position. The face recognition logic 227 is executed to recognize a detected face within a video frame 103 as corresponding to a particular person or cast member. The temporal smoothing logic 228 may employ a temporal smoothing factor to smooth the face recognition results across video frames 103 in which a previously or subsequently recognized face is unrecognized.

The scene break detection application 218 is executed to detect scene breaks within video programs. To this end, the scene break detection application 218 may monitor contrast and other characteristics that change between video frames 103 to determine that the video program has moved from one scene to another. The manual review system 221 may be executed to provide manual review functionality for the cast member detection application 215 and/or the scene break detection application 218. For example, the manual review system 221 may submit unrecognized faces for manual identification. Also, the manual review system 221 may submit recognized faces for manual configuration or disambiguation from multiple possible cast members.

The data stored in the data store 212 includes, for example, video programs 230, scene data 233, cast member data 236, cast member/frame associations 239, unrecognized face data 242, manual review data 245, recognition data models 248, detection data models 251, and potentially other data. Each of the video programs 230 corresponds to video data comprising a sequence of video frames 103. For example, a video program 230 may include 24 frames per second, 30 frames per second, or another frequency. A video program 230 may correspond to a movie, a television show, and/or other video content in which people appear.

The scene data 233 describes various scenes into which the video programs 230 may be divided. A scene corresponds to a period of time in the video program 230 having multiple video frames 103, and may be determined as having a distinct plot element or setting. In one embodiment, a scene is defined as having a beginning video frame 103 and an ending video frame 103. In another embodiment, a scene is defined as having a beginning video frame 103 and a duration. The scene data 233 may be generated automatically by the scene break detection application 218 or may be predetermined.

The cast member data 236 describes various actors, actresses, extras, etc., who appear in one or more of the video programs 230. The cast member data 236 may include reference images 109 and cast member/video program associations 257. Each reference image 109 is known to depict a particular cast member. A reference image 109 may correspond to a headshot, a publicity still, a screen grab from a video frame 103, and/or any other image that is known to depict a particular cast member. The reference image 109 may show the cast member in character as he or she appears in a video program 230. Alternatively, the reference image 109 may show the cast member out-of-character or having an appearance of another character not in a particular video program 230.

The cast member/video program associations 257 correspond to pre-existing data that associates particular cast members with particular video programs 230. For example, the cast member/video program associations 257 may be obtained from cast listings provided by external sources of information. The cast member/video program associations 257 indicate cast members who appear in the video programs 230. In some cases, the cast member/video program associations 257 may indicate cast members who participate in the production of a video program 230 but do not actually appear (e.g., voice talent).

The cast member/frame associations 239 are generated by the cast member detection application 215. The cast member/frame associations 239 indicates cast members who are recognized by the cast member detection application 215 as appearing in a particular video frame 103 or are predicted to appear in the particular video frame 103. In some cases, the cast member/frame associations 239 indicate that a cast member appears in a particular scene comprising a given video frame 103, even if the cast member is not actually detected and recognized as being in the given video frame 103. The cast member/frame associations 239 may be on a per-frame basis, per-scene basis, a time of appearance basis, or determined according to other approaches.

The unrecognized face data 242 includes data that corresponds to faces that have been detected but not recognized in the video program 230. For example, a face may correspond to a person who appears in the video program 230 but is uncredited and not included in the cast member/video program associations 257. Alternatively, a face may correspond to a known cast member with reference images 109 but may be unrecognizable due to camera angle, lighting, character makeup, and/or other factors.

The manual review data 245 includes data facilitating and produced as a result of a manual review through the manual review system 221. The manual review data 245 may record whether a face recognition was confirmed correct or incorrect, a selection of one of multiple possible cast members for a detected face, an identification of a cast member for an unrecognized face, and so on. The tasks relating to manual review may be assigned to various agents or other users, who may be contracted on a per-task basis. The manual review data 245 may track the productivity and accuracy of the various agents, where the accuracy may be assessed through a multi-layer manual review involving multiple agents.

The recognition data models 248 and the detection data models 251 may be employed for machine learning purposes. For example, the recognition data models 248 and the detection data models 251 may be trained through manual confirmation of correct or incorrect face detections and/or face recognitions. Where correct recognitions and/or detections are confirmed, the particular detected face may be employed in the recognition data models 248 and/or the detection data models 251 to improve the accuracy of further detections and recognitions for a particular video program 230 or for a particular cast member appearing across multiple video programs 230.

The detection and recognition configuration data 254 may include various parameters controlling the face detection logic 224 and the face recognition logic 227. For example, the detection and recognition configuration data 254 may include a temporal smoothing factor for use by the temporal smoothing logic 228. In one embodiment, the temporal smoothing factor may correspond to a maximum number of video frames 103 in which a cast member may be unrecognized, and despite being unrecognized, still be associated with the video frames 103 due to being detected prior to and/or after the video frames 103. The detection and recognition configuration data 254 may include a maximum threshold for a quantity of faces to be detected in a video frame 103. For example, a video frame 103 may depict a large crowd of extras and it may be desirable to disable cast member detection for the particular video frame 103 or scene.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display 260. The display 260 may comprise, for example, one or more devices such as liquid crystal display (LCD) displays, gas plasma-based flat panel displays, organic light emitting diode (OLED) displays, LCD projectors, or other types of display devices, etc.

The client 206 may be configured to execute various applications such as a manual review client application 263 and/or other applications. The manual review client application 263 may be executed to facilitate completing a task that is a part of a manual review of face detection and/or face recognition. The manual review client application 263 may be executed in a client 206, for example, to access network content served up by the computing environment 203 and/or other servers, thereby rendering a user interface 266 on the display 260. The manual review client application 263 may, for example, correspond to a browser, a mobile application, etc., and the user interface 266 may correspond to a network page, a mobile application screen, etc. The client 206 may be configured to execute applications beyond the manual review client application 263 such as, for example, video content player applications, browsers, mobile applications, email applications, social networking applications, and/or other applications. Although the manual review client application 263 is described as being executed in a client 206, in some embodiments, the manual review client application 263 may be executed in the same system as the cast member detection application 215 or other components described herein.

Next, a general description of the operation of the various components of the networked environment 200 is provided. To begin, various video programs 230 and cast member data 236 may be loaded in the data store 212. In some embodiments, the scene data 233 may then be loaded from an external source or generated by way of the scene break detection application 218. The recognition data models 248 and/or the detection data models 251 may be primed based at least in part on previous detections and/or recognitions performed through the cast member detection application 215 and potentially subjected to manual review via the manual review system 221.

The cast member detection application 215 begins processing a particular video program 230 and obtains a set of reference images 109 that corresponds to the cast member/video program associations 257. The set of reference images 109 show the cast members who appear or might appear in the video program 230. It is noted that various cast members, credited or uncredited, may appear in the video program 230 but have no corresponding reference images 109. In one embodiment, data encoding characteristics of the set of reference images 109 (e.g., histograms, hashes, facial profiles, etc.) may be obtained rather than data encoding the reference images 109 themselves.

The cast member detection application 215 processes the video program 230 by sampling a video frame 103. A particular video program 230 may have vast quantities of video frames 103, so the cast member detection application 215 may be configured to sample the video program 230 by processing, for example, one video frame 103 per second of video rather than all 24 video frames 103 within that second of video. In some embodiments, every video frame 103 may be processed by the cast member detection application 215.

In processing a video frame 103, the cast member detection application 215 uses face detection logic 224 to detect zero or more faces present in the particular video frame 103. In some cases, the face detection logic 224 may employ the face tracker logic 225, which may use previous or subsequent video frames 103 to map a trajectory of a detected face (i.e., a sequence of faces similar in appearance and/or position), which may improve accuracy of face detection in the intervening frames. The face detection logic 224 may employ a detection data model 251 to perform the detection.

In response to detecting a face, the cast member detection application 215 employs the face recognition logic 227 to recognize the detected face. For example, the face recognition logic 227 may operate on a portion of the video frame 103 that has been identified by the face detection logic 224 as likely depicting a face. The face recognition logic 227 may compare data from the reference images 109 to recognize which person corresponds to the detected face.

In one embodiment, the face recognition logic 227 may employ a universal set of the reference images 109 across cast members of a multitude of video programs 230. In other embodiments, the face recognition logic 227 employs only those reference images 109 that correspond to cast members identified in the cast member/video program associations 257. This reduction in reference images 109 to consider may improve processing speed and may reduce the likelihood of mistaken recognitions. In some of these embodiments, the face recognition logic 227 may expand the set of reference images 109 to consider beyond those cast members indicated in the cast member/video program associations 257 when a recognition could not be made using the specific set associated with the known cast members.

Upon recognition of a face, the cast member detection application 215 generates a cast member/frame association 239 for the particular video frame 103. The cast member/frame association 239 may indicate a position of the recognized face within the particular video frame 103 and/or may merely indicate that the recognized face appears somewhere in the particular video frame 103. Due to sampling, one cast member/frame association 239 may pertain to a range of multiple video frames 103.

Additionally, the face recognition logic 227 may employ temporal smoothing logic 228 to account for video frames 103 in which the face of a cast member is briefly absent or cannot be detected/recognized due to camera angle, lighting, etc. For example, if a cast member is detected in a first frame, the cast member may implicitly be detected in the next N frames (or previous N frames) as specified by a temporal smoothing factor. Alternatively, if a cast member is detected in a first frame, not detected in N second frames, and then detected again in a third frame, the cast member may implicitly be detected in the N second frames depending on a temporal smoothing factor and the value of N.

In various embodiments, associations of cast members to video frames 103 may be performed on a per-scene basis. In one embodiment, if a cast member is recognized once in a scene, the cast member may be associated with the entire scene. In another embodiment, the cast member becomes associated with the rest of a scene beginning with a first recognized appearance in a video frame 103 of the scene.

Face recognition may be handled in a different manner when many faces appear. For example, in video frames 103 where a crowd is shown, face recognition may be disabled or restricted to a set of recently recognized faces based at least in part on the detection of N faces, where N is a maximum threshold for a quantity of faces. When face recognition is disabled, the previously recognized cast members may continue to be associated with the particular video frames 103 subject to the temporal smoothing factor and/or special thresholds that apply.

In one scenario, a particular face is not recognized by the face recognition logic 227. If so, data indicating or derived from the unrecognized face may be recorded in the unrecognized face data 242. In one embodiment, a clustering analysis may be employed on the unrecognized face data 242 to determine groupings of unrecognized people or characters who appear in the video program 230. The unrecognized people may then be submitted for manual review and identification via the manual review system 221. For example, the manual review system 221 may instruct the client 206 to display one or more representative images for each unrecognized person. A user interface 266 may request a name and/or other information from the manual reviewer. In some embodiments, the user interface 266 may present a listing of possible choices for cast members, with the manual reviewer selecting from the listing.

Manual review may also be indicated in situations where a face cannot be recognized up to a certain confidence level or threshold. For example, the face recognition logic 227 may determine that the face is likely to correspond to a particular cast member (or subset of cast members from the video program 230) but cannot confidently make the determination. In such a situation, the manual reviewer at the client 206 may be asked to confirm or disambiguate the determination.

In response to manual confirmation or rejection of recognitions and/or detections, the recognition data models 248 and/or the detection data models 251 may be updated according to machine learning techniques. In one example, a manually confirmed face may be captured from a video frame 103 and added to the reference images 109 as pertaining to the cast member, or particular, to the cast member as depicted in the video program 230. Non-confirmed detections and/or recognitions may also be employed in some embodiments for the purposes of updating the reference images 109, the recognition data models, and/or the detection data models 251.

Figure 3A:
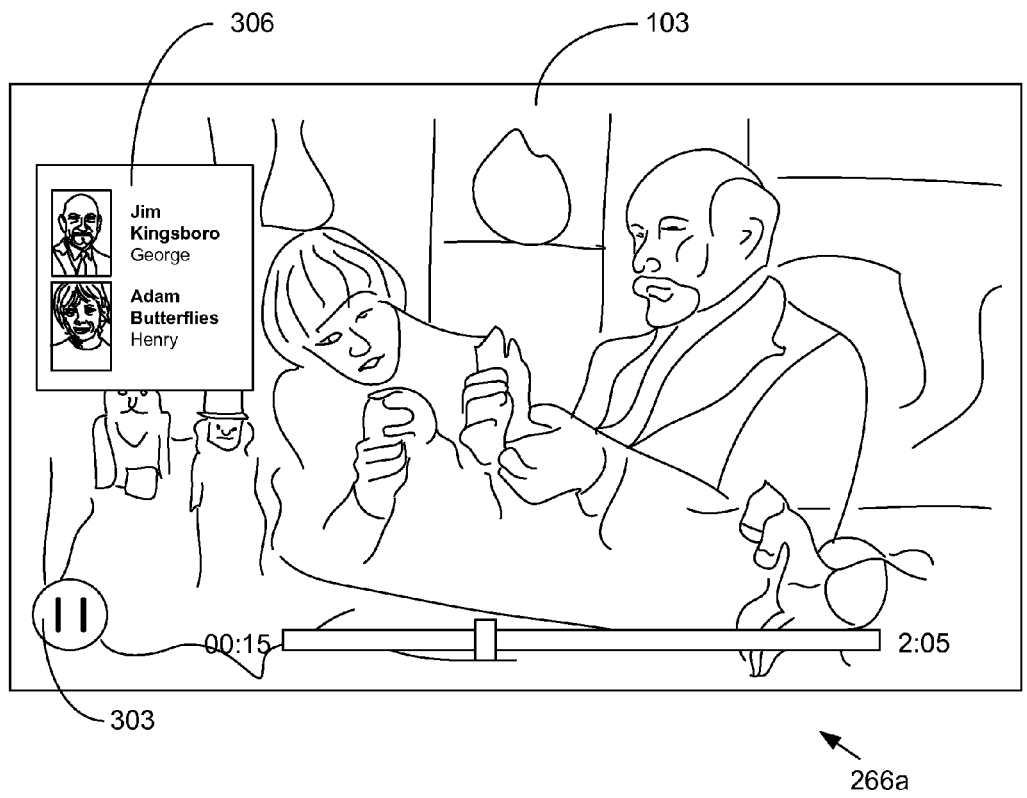
FIGS. 3A-3C are drawings of examples of user interfaces rendered by a client in the networked environment of FIG. 2 according to various embodiments of the present disclosure.

The cast member/frame associations 239 that are generated through the cast member detection application 215 may be employed to show viewers who is appearing at a given time in a video program 230. Referring to FIG. 3A, shown is one example of a user interface 266a rendered by a client 206 (FIG. 2) in the networked environment 200 (FIG. 2) according to embodiments of the present disclosure. The user interface 266a includes the video frame 103 that is currently being displayed, various media controls 303, and a cast member identification component 306 that identifies the cast members associated with the video frame 103 and/or scene.

Figure 3B:
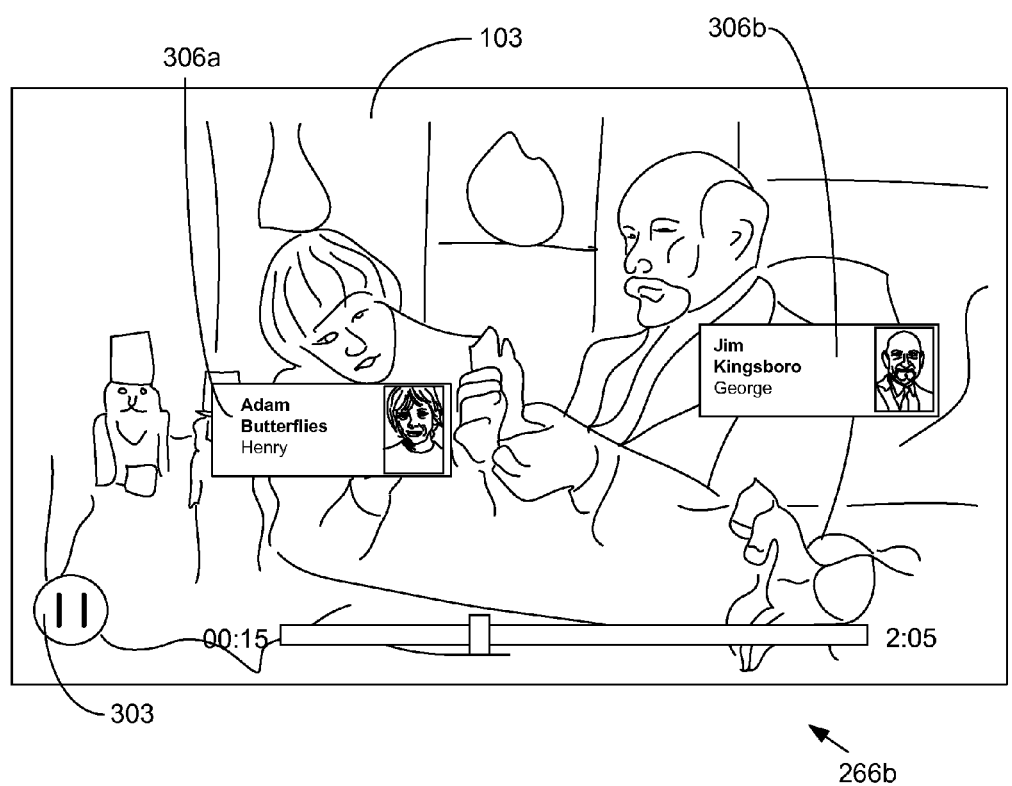

Referring to FIG. 3B, shown is another example of a user interface 266b rendered by a client 206 (FIG. 2) in the networked environment 200 (FIG. 2) according to embodiments of the present disclosure. In the alternative example of FIG. 3B, the cast member identification components 306a and 306b are rendered such that they are positioned relative to the detected faces 106a and 106b (FIG. 1) of the video frame 103 using position information recorded in the cast member/frame associations 239. The cast member/frame associations 239 may be employed in a variety of ways to facilitate navigation throughout the video program 230, e.g., through a user interface 266 that shows locations or scenes in a video program 230 where a particular cast member appears on screen, to indicate a location or scene in a video program 230 where a cast member first appears, and so on. According to one embodiment, if a particular cast member is determined to be in a current scene but is not recognized in a current frame, a cast member identification component may be rendered separately, e.g., off to the side, at the top, at the bottom, etc., possibly with a label indicating that the particular cast member is not pictured or is off-screen.

Various techniques related to enhancing video content using extrinsic data such as cast member/frame associations 239 are described in U.S. patent application Ser. No. 13/227,097 entitled "SYNCHRONIZING VIDEO CONTENT WITH EXTRINSIC DATA" and filed on Sep. 7, 2011, U.S. patent application Ser. No. 13/601,267 entitled "ENHANCING VIDEO CONTENT WITH EXTRINSIC DATA" and filed on Aug. 31, 2012, U.S. patent application Ser. No. 13/601,235 entitled "TIMELINE INTERFACE FOR VIDEO CONTENT" and filed on Aug. 31, 2012, and U.S. patent application Ser. No. 13/601,210 entitled "PROVIDING EXTRINSIC DATA FOR VIDEO CONTENT" and filed on Aug. 31, 2012, all of which are incorporated herein by reference in their entirety.

Figure 3C:
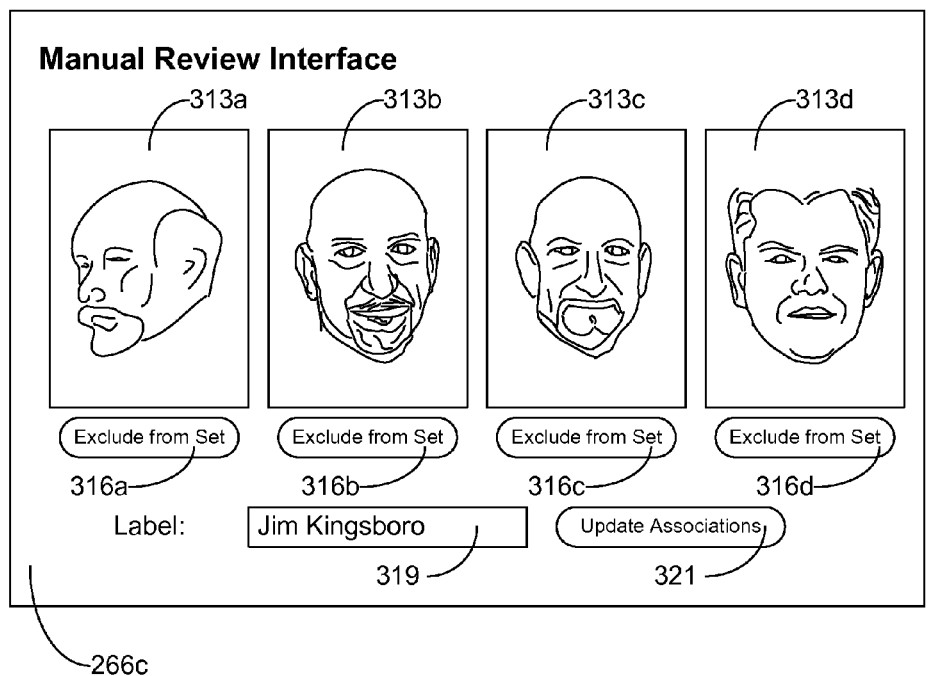

Turning next to FIG. 3C, shown is another example of a user interface 266c rendered by a client 206 (FIG. 2) in the networked environment 200 (FIG. 2) according to embodiments of the present disclosure. The user interface 266c corresponds to an exemplary manual review interface rendered by the manual review client application 263 (FIG. 2). The user interface 266c presents a set of detected faces 313a, 313b, 313c, and 313d for manual review and confirmation. The detected faces 313 may have been recognized by the face recognition logic 227 (FIG. 2). In one example, one or more of the detected faces 313 may be recognized below a minimum confidence level, thereby prompting manual confirmation.

In the example of FIG. 3C, each of the detected faces 313 is presented in association with a respective exclude component 316a, 316b, 316c, and 316d for excluding the corresponding detected face 313 from being recognized. In this non-limiting example, the detected face 313d is an outlier and does not belong with the other detected faces 313a, 313b, and 313c, so the manual review user will likely select the detected face 313d to be excluded by way of the respective exclude component 316d. In other examples, the detected face 313d may be emphasized or highlighted in the user interface 266c to indicate to the user that the confidence level associated with the recognition is below a threshold.

A labeling component 319 may be provided for the manual review user to enter a name or other label for the cast member associated with the detected faces 313. In this case, the cast member is to be labeled "Jim Kingsboro." In various embodiments, a selection component may be provided for the manual review user to search for and select a particular cast member from a database, such as the cast member/video program associations 257 (FIG. 2). An update associations 321 component may be provided for the manual review user to send the update (e.g., changed labeling, excluded detected faces 313, etc.) to the manual review system 221 (FIG. 2). Such an update may be reviewed and verified by other users before it is committed to the data store 212 (FIG. 2). By excluding an outlier detected face 313d and confirming the other detected faces 313a, 313b, and 313c, the recognition data models 248 (FIG. 2) may be updated and improved for subsequent face recognition and scrubbing of the data set.

Figure 4A:
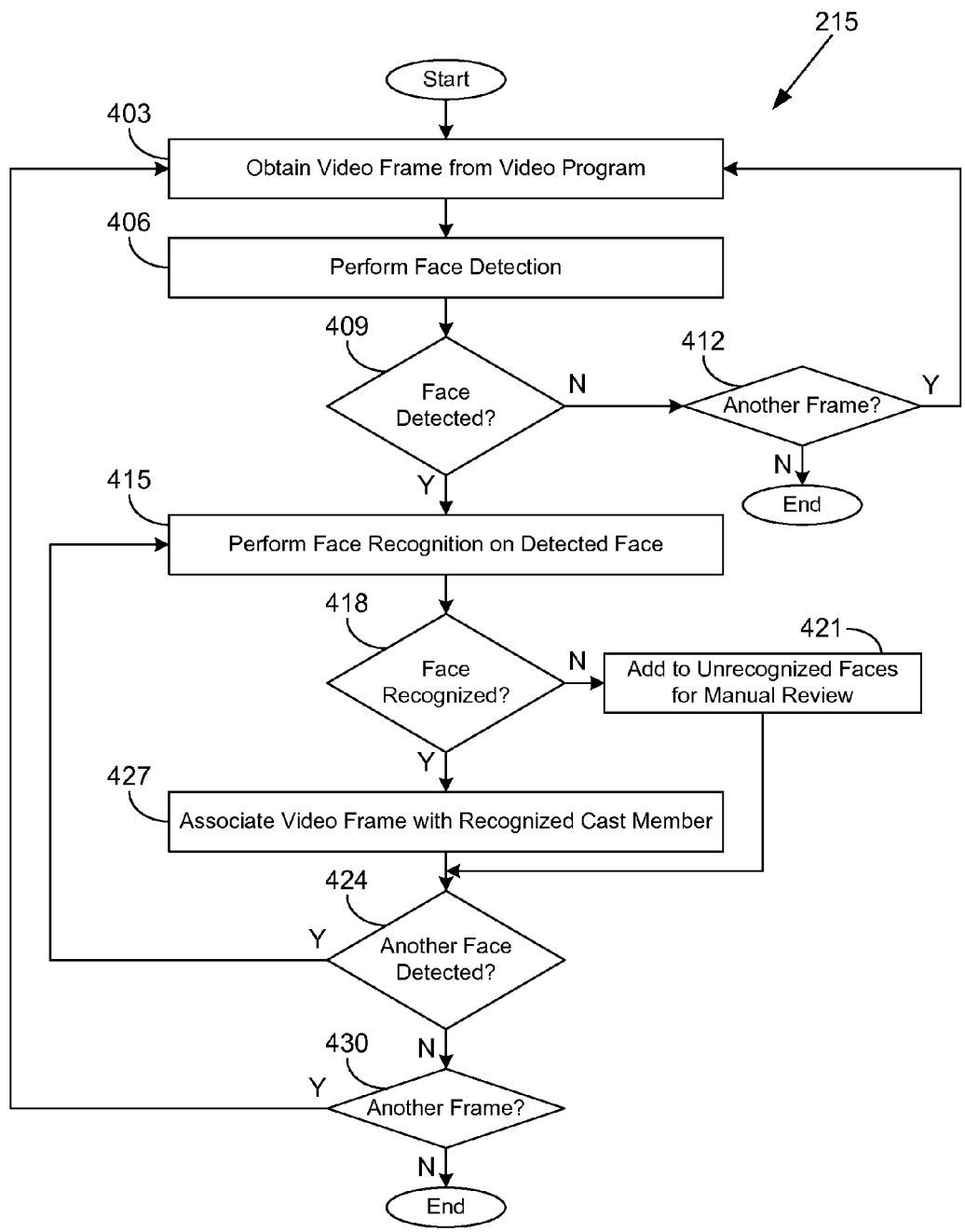
FIGS. 4A and 4B are flowcharts illustrating examples of functionality implemented as portions of a cast member detection application executed in a computing environment in the networked environment of FIG. 2 according to various embodiments of the present disclosure.

Referring next to FIG. 4A, shown is a flowchart that provides one example of the operation of a portion of the cast member detection application 215 according to various embodiments. It is understood that the flowchart of FIG. 4A provides merely an example of the many different types of functional arrangements that may be employed to implement the operation of the portion of the cast member detection application 215 as described herein. As an alternative, the flowchart of FIG. 4A may be viewed as depicting an example of steps of a method implemented in the computing environment 203 (FIG. 2) according to one or more embodiments.

Beginning with box 403, the cast member detection application 215 obtains a video frame 103 (FIG. 2) from a video program 230 (FIG. 2). In box 406, the cast member detection application 215 employs the face detection logic 224 (FIG. 2) to perform face detection on the video frame 103. The face detection logic 224 may, for example, use a detection data model 251 (FIG. 2).

In box 409, the cast member detection application 215 determines whether a face is detected. If a face is not detected, the cast member detection application 215 moves from box 409 to box 412 and determines whether another video frame 103 remains to be processed. If so, the cast member detection application 215 returns to box 403 and obtains the next video frame 103 to process. If another video frame 103 does not remain to be processed, the portion of the cast member detection application 215 ends.

If a face is detected, the cast member detection application 215 moves from box 409 to box 415. In box 415, the cast member detection application 215 employs the face recognition logic 227 (FIG. 2) to perform face recognition on the detected face. To this end, the face recognition logic 227 may use the reference images 109 (FIG. 2), the cast member/video program associations 257 (FIG. 2), the recognition data models 248 (FIG. 2), and/or other data. In box 418, the cast member detection application 215 determines whether a face has been recognized. If the face has not been recognized, the cast member detection application 215 continues from box 418 to box 421 and adds the detected face to the unrecognized face data 242 for later cluster analysis and manual identification. The cast member detection application 215 then proceeds to box 424.

If the face has been recognized, the cast member detection application 215 instead moves from box 418 to box 427. In box 427, the cast member detection application 215 associates the video frame 103 with the recognized cast member. Accordingly, the cast member detection application 215 may generate a cast member/frame association 239 (FIG. 2). In some cases, the face may be not confidently recognized, e.g., at a confidence level threshold. Upon such a situation, the detected face may be submitted to manual review for confirmation before an association is generated. The cast member detection application 215 continues to box 424.

In box 424, the cast member detection application 215 determines whether another face in the video frame 103 is detected. If so, the cast member detection application 215 returns to box 415 and performs face recognition on the detected face. If no other faces are detected, the cast member detection application 215 continues to box 430. In box 430, the cast member detection application 215 determines whether another video frame 103 remains to be processed. If another video frame 103 is to be processed, the cast member detection application 215 returns to box 403 and obtains the next video frame. Otherwise, the portion of the cast member detection application 215 ends.

Figure 4B:
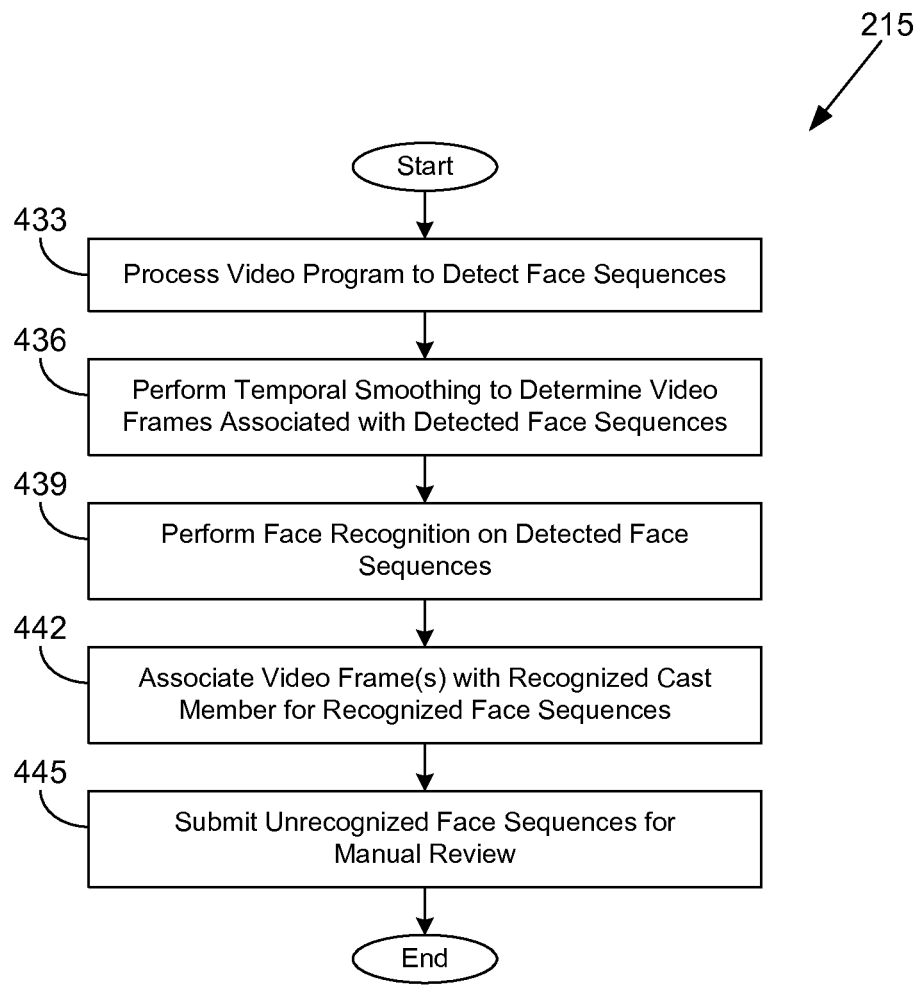

Moving on to FIG. 4B, shown is a flowchart that provides another example of the operation of a portion of the cast member detection application 215 according to various embodiments. It is understood that the flowchart of FIG. 4B provides merely an example of the many different types of functional arrangements that may be employed to implement the operation of the portion of the cast member detection application 215 as described herein. As an alternative, the flowchart of FIG. 4B may be viewed as depicting an example of steps of a method implemented in the computing environment 203 (FIG. 2) according to one or more embodiments.

To begin, in box 433, the cast member detection application 215 employs the face detection logic 224 (FIG. 2) to detect face sequences in a video program 230 (FIG. 2). To this end, the face detection logic 224 may use the face tracker logic 225 (FIG. 2) to detect a sequence of faces that spans multiple frames 103 (FIG. 2). In box 436, the cast member detection application 215 employs the temporal smoothing logic 228 (FIG. 2) to determine video frames 103 that are associated with the detected face sequences.

In box 439, the cast member detection application 215 utilizes the face recognition logic 227 (FIG. 2) to perform face recognition on the detected face sequences. In box 442, the cast member detection application 215 associates video frames 103 with a recognized cast member for the face sequences that are recognized. In box 445, the cast member detection application 215 submits the unrecognized face sequences for manual review through the manual review system 221. Thereafter, the portion of the cast member detection application 215 ends.

Figure 5:
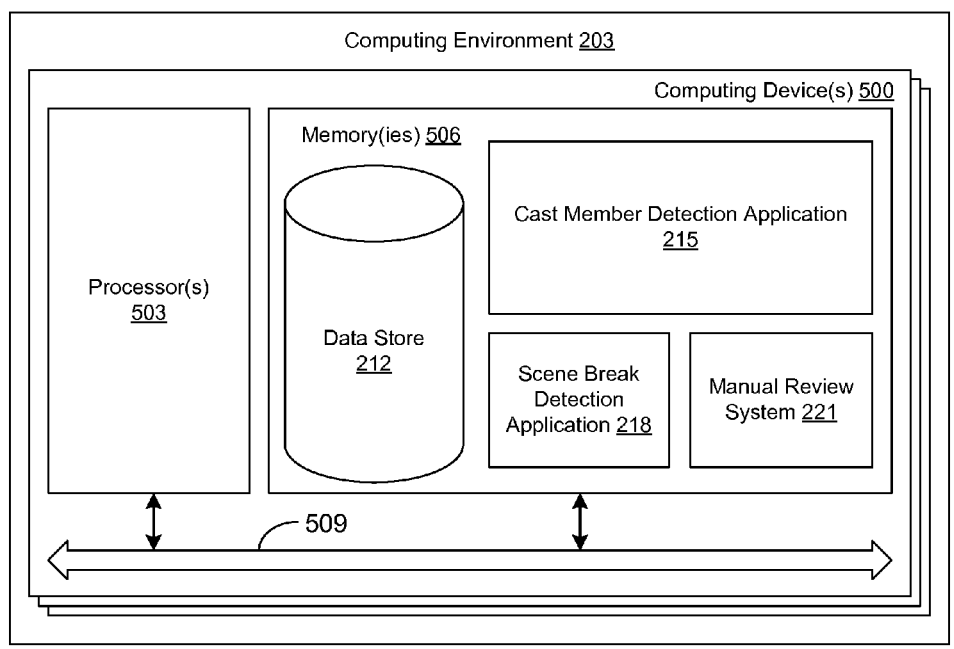
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the cast member detection application 215, the scene break detection application 218, the manual review system 221, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD)

or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the cast member detection application 215, the face detection logic 224 (FIG. 2), the face tracker logic 225 (FIG. 2), the face recognition logic 227 (FIG. 2), the temporal smoothing logic 228 (FIG. 2), the scene break detection application 218, the manual review system 221, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4A-4B show the functionality and operation of an implementation of portions of the cast member detection application 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 4A-B show a specific order of execution, it is understood that the order of execution may differ from that which is depicted. For example, the order of execution of two or more blocks may be scrambled relative to the order shown. Also, two or more blocks shown in succession in FIGS. 4A-4B may be executed concurrently or with partial concurrence. Further, in some embodiments, one or more of the blocks shown in FIGS. 4A-4B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the cast member detection application 215, the face detection logic 224, the face tracker logic 225, the face recognition logic 227, the temporal smoothing logic 228, the scene break detection application 218, and the manual review system 221, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program that, when executed by at least one computing device, causes the at least one computing device to at least:

obtain data indicating a plurality of cast members known to appear in a video program;
subsequent to obtaining the data indicating the plurality of cast members known to appear in the video program, sample a first frame from the video program;
detect a face in the first frame;
recognize the detected face in the first frame as being one of the plurality of cast members known to appear in the video program based at least in part on a plurality of reference images corresponding to the plurality of cast members, wherein recognizing the detected face in the first frame is restricted to a set of faces recognized within a predefined time period in response to determining that a quantity of detected faces in the first frame meets a maximum threshold;
generate a first association between the one of the plurality of cast members and the first frame when the detected face is recognized as being the one of the plurality of cast members; and
generate a second association between the one of the plurality of cast members and a second frame of the video program based at least in part on the first association, a third association between the one of the plurality of cast members and a third frame of the video program, and a temporal smoothing factor.

2. The non-transitory computer-readable medium of claim 1, wherein the program further causes the at least one computing device to at least submit the first association for a manual review in response to determining that a recognition confidence does not meet a minimum threshold.

3. The non-transitory computer-readable medium of claim 1, wherein the program further causes the at least one computing device to recognize the detected face based at least in part on a previously recognized face in the video program.

4. A system, comprising:
a data store; and
at least one computing device comprising a hardware processor, the at least one computing device being in communication with the data store, the at least one computing device being configured to at least:
before recognizing one of a plurality of persons in a video program, obtain data indicating the plurality of persons that are known to appear in the video program, individual ones of the plurality of persons being associated with a reference image depicting a respective face of the individual ones of the plurality of persons;
obtain a frame from the video program;
detect a face in the frame;
recognize the detected face in the frame as being the one of the plurality of persons based at least in part on the reference image depicting the face of the one of the plurality of persons, wherein recognizing the detected face in the frame is restricted to a set of faces recognized within a predefined time period in response to determining that a quantity of detected faces in the frame meets a maximum threshold; and
generate an association between the one of the plurality of persons and the frame in response to the detected face in the frame being recognized as being the one of the plurality of persons.

5. The system of claim 4, wherein the at least one computing device is further configured to at least detect a sequence of faces in a series of frames from the video program based at least in part on geometric proximity.

6. The system of claim 4, wherein the at least one computing device is further configured to at least recognize the detected face based at least in part on a previously detected face within another frame in the video program.

7. The system of claim 4, wherein the at least one computing device is further configured to at least detect the face based at least in part on a position of a previously detected face within another frame in the video program.

8. The system of claim 4, wherein the at least one computing device is further configured to at least:
obtain data indicating that the frame is part of a scene of the video program, the scene having a beginning frame and an ending frame; and
generate an association between the one of the plurality of persons and the scene.

9. The system of claim 8, wherein the at least one computing device is further configured to at least generate the data indicating that the frame is part of the scene of the video program by performing scene break detection.

10. The system of claim 8, wherein the one of the plurality of persons is unrecognized in the beginning frame of the scene.

11. The system of claim 4, wherein the reference image corresponds to an image that is external to the video program.

12. The system of claim 4, wherein the at least one computing device is further configured to at least:
determine that the one of the plurality of persons is unrecognized within an intervening frame between the frame and a subsequent frame;
recognize another detected face in the subsequent frame as being the one of the plurality of persons; and
generate an association between the one of the plurality of persons and the intervening frame based at least in part on a temporal smoothing factor and in response to recognizing the other detected face in the subsequent frame as being the one of the plurality of persons.

13. The system of claim 12, wherein the at least one computing device is further configured to at least generate the association between the one of the plurality of persons and the intervening frame based at least in part on a position of the detected face in the frame and a position of the other detected face in the subsequent frame.

14. The system of claim 4, wherein the at least one computing device is further configured to at least:
determine that the detected face is not recognized as being any of the plurality of persons;
store the detected face that is not recognized;
perform a clustering analysis on a plurality of unrecognized faces detected in the video program to generate a set of unrecognized persons that appear in the video program; and
generate an association between the frame and one of the set of unrecognized persons, the one of the set of unrecognized persons corresponding to the detected face that is not recognized.

15. The system of claim 14, wherein the at least one computing device is further configured to at least:
submit the set of unrecognized persons for a manual review;
obtain an identification of the one of the set of unrecognized persons from the manual review; and
generate an association between the identification and the one of the set of unrecognized persons.

16. The system of claim 4, wherein the at least one computing device is further configured to at least:

determine that the detected face may correspond to a plurality of the persons;

submit the plurality of persons for manual review along with at least a portion of the frame;

obtain a selection of one of the plurality of the persons from the manual review; and recognize the detected face in the frame as being the selected one of the plurality of the persons.

17. The system of claim 4, wherein the at least one computing device is further configured to at least update a recognition data model for the one of the plurality of persons based at least in part on the frame in response to receiving a manual confirmation of the recognition of the detected face in the frame as being the one of the plurality of persons, and recognize the detected face based at least in part on the recognition data model.

18. The system of claim 4, wherein the individual ones of the plurality of persons are shown in the reference image as the individual ones of the plurality of persons appear in the video program.

19. A method, comprising:

obtaining, by at least one computing device, data from an external source, the data indicating a plurality of persons known to appear in a video program, individual ones of the plurality of persons being associated with a respective reference image depicting a respective face of the individual ones of the plurality of persons;

obtaining, by the at least one computing device, a frame from a scene of the video program;

detecting, by the at least one computing device, a face in the frame;

recognizing, by the at least one computing device, the detected face in the frame as one of the plurality of persons based at least in part on a reference image depicting a person, wherein recognizing the detected face in the frame is restricted to a set of faces recognized within a predefined time period in response to determining that a quantity of detected faces in the frame meets a maximum threshold; and generating, by the at least one computing device, an association between the person and the scene in response to the detected face in the frame being recognized as being the person.

20. The method of claim 19, wherein the association records a position of the detected face in the frame.

21. The method of claim 19, further comprising detecting, by the at least one computing device, a beginning frame and an ending frame for the scene in the video program.

22. The method of claim 19, further comprising:

submitting, by the at least one computing device, the association for a manual review; and updating, by the at least one computing device, a data model employed by the recognizing based at least in part on the manual review.

23. The method of claim 19, further comprising:

determining, by the at least one computing device, that the detected face does not correspond to a recognizable person;

storing, by the at least one computing device, data indicating the detected face as an unrecognized face; and generating, by the at least one computing device, a set of representative unrecognized faces by performing a cluster analysis on a plurality of unrecognized faces from the video program.

24. The method of claim 19, further comprising annotating, by the at least one computing device, the detected face in the frame with a character name and a cast member name of the one of the plurality of persons recognized in the frame.

* * * * *